Dec. 15, 1959   J. MATTERN ET AL   2,917,302
SUSPENSION SYSTEM, ESPECIALLY FOR VEHICLES
Filed March 20, 1956   2 Sheets-Sheet 1
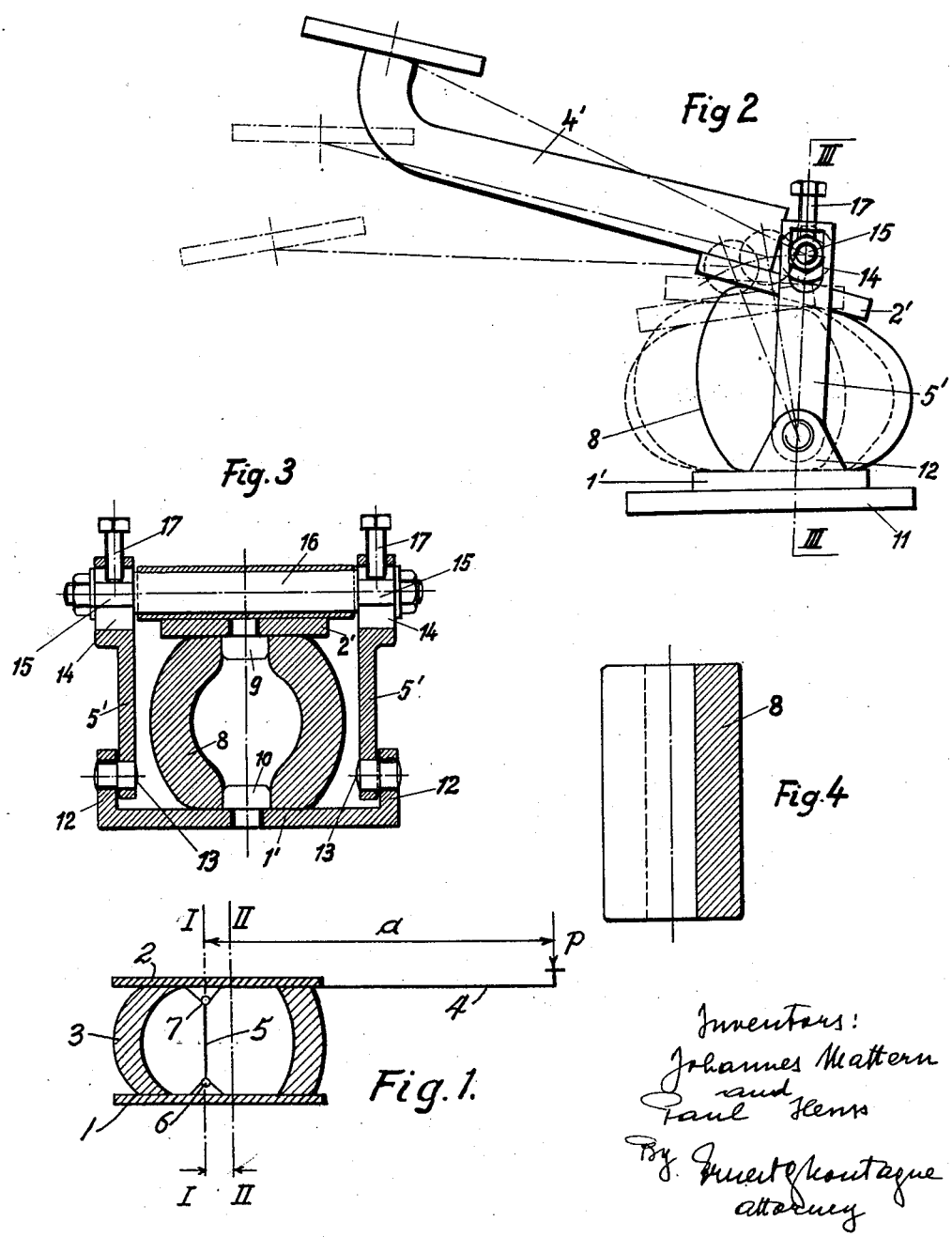
Inventors:
Johannes Mattern
and
Paul Henn
By Ernest F. Montague
attorney

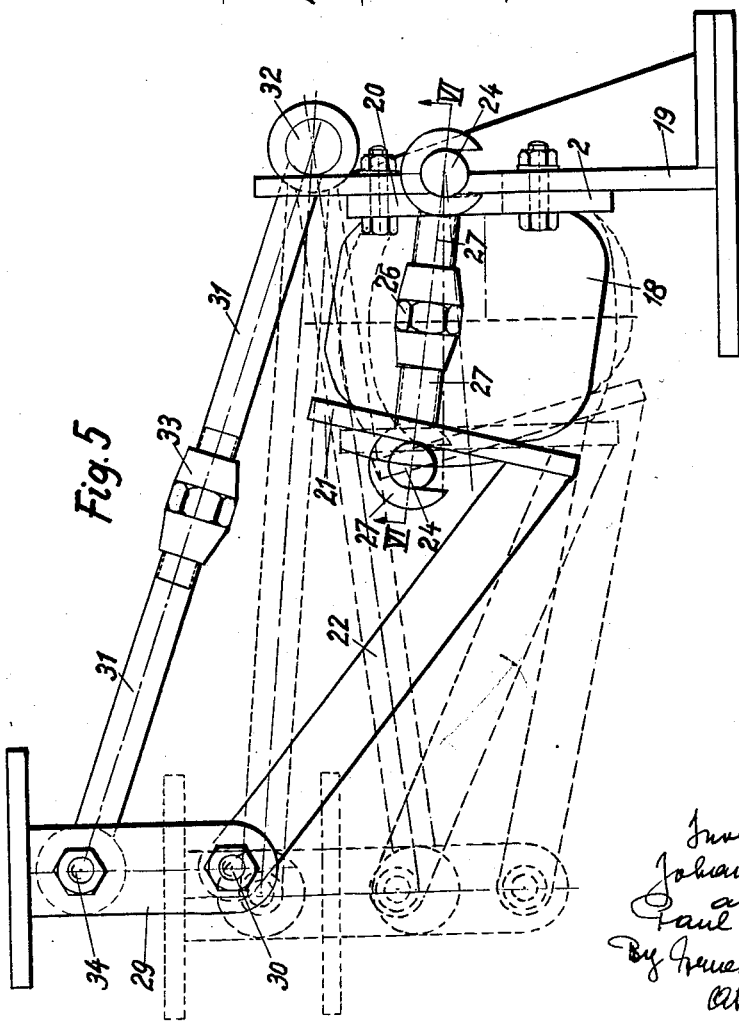

United States Patent Office 2,917,302
Patented Dec. 15, 1959

2,917,302

SUSPENSION SYSTEM, ESPECIALLY FOR VEHICLES

Johannes Mattern, Northeim, Hannover, and Paul Henss, Einbeck, Germany; said Henss assignor to said Mattern Application March 20, 1956, Serial No. 572,728

2 Claims. (Cl. 267—1)

The present invention relates to a suspension system for vehicles and describes an arrangement suitable for the suspension of seats on tractors or similar vehicles. A hollow rubber body which is pre-loaded is employed in a manner to render a springing and an absorbing effect.

Hitherto, suspension systems of this type had the disadvantage that under direct axial loads the rubber body acted like a bumper which resulted in a very hard springing effect. It has also been proposed to employ a hollow rubber body for such systems which is secured between plates which are tiltable towards each other to render a springing effect. Through this arrangement, however, no absorbing action is obtained.

It is, therefore, one object of the present invention to eliminate these deficiencies by providing a rubber body which is mounted under a certain pre-load between two pressure plates. The distance between the plates is maintained by a link which encloses or passes through the rubber body and which is hinged to both of the plates, one of which forming the support for the springing element, and the other one being rigidly connected with the link which bears against the member to be suspended. It is not important whether the system is used for the suspension of vehicle axles, of vehicle bodies, or of vehicle seats, or in other stationary plants. With particular advantage the system is employed in the base mounting for the seat on agricultural machinery, tractors, or the like. In such arrangements it renders a good springing, as well as a good absorbing effect so that increased operating safety is achieved due to the better seating of the driver.

It is another object of the present invention to provide a suspension system, wherein to control the pre-load, i.e. to adjust the stiffness of the spring, the distance between both of the plates is variable. This can be accomplished by making the link, connecting both plates, variable in its length or at its point of engagement.

It is yet another object of the present invention to provide a suspension system wherein the link is arranged in the center line of a rubber body, or the axes may be displaced relative to each other, particularly in the direction of a suspension arm, or a symmetrically or an unsymmetrically shaped rubber body, preferably a hollow rubber body, may be employed so that the ratio of the springing and the absorbing effect is variable. It is important that both pressure plates are hinged to the connecting link so that the rubber body which may also be replaced by a body of resilient plastic material, besides rendering a springing effect has to do certain work to change its shape which action enables a better absorption of the vibrations. Conveniently, the link connecting the two plates, forms a turnbuckle which at each of its ends forms a hinge fitting against which bears the pressure plate.

In suspension arrangements for vehicle seats it is important that in spite of the movements of the structure the line of vision of the driver is kept straight. For this reason, the position of the seat preferably is not varied. This is accomplished in such a manner that the part to be suspended is connected with the stationary part through means of an additional link to form a parallel construction. The position of the additional link may be variable. The seat bucket is secured on its support arm in a bearing, the position of which is adjusted through means of the additional link upon each spring movement so that the seat surface is always maintained horizontal, independent of the movements of the spring.

With these and other objects in view which will become apparent in the following detailed description, the present invention will be clearly understood in connection with the accompanying drawings, in which:

Figure 1 is a diagrammatic illustration of the suspension arrangement;

Fig. 2 is a side view of an arrangement which is employed on a vehicle seat, for example;

Fig. 3 is a sectional view, taken along the lines 3—3 of Fig. 2;

Fig. 4 is a view of the rubber body in its normal position;

Fig. 5 is a side view of a seat mounting; and

Fig. 6 is a sectional view taken along the lines 6—6 of Fig. 5.

Referring now to the drawings, the suspension system substantially comprises two plates 1 and 2. The rubber body 3 is mounted, under a certain pre-load, between the plates 1, 2. Plate 1 is mounted on the chassis of a vehicle, for example, whilst plate 2 is rigidly connected with the link 4, at the end of which is the member to be suspended, as for instance, a seat, a vehicle axle, a wheel, etc.

The distance between the two plates 1 and 2 is maintained by a link 5 which engages each of the plates by means of a joint or pivot 6 and 7, respectively. The link 5 may pass through the hollow body or, preferably, a two-armed link is employed which encloses the rubber body. The axis I—I of the link 5 and, respectively, of the plate arrangement, may coincide with the axis II—II of the rubber body, or both of them are spaced apart from each other for a variable distance "e."

The rubber body 3 is pre-loaded and mounted between the two plates 1 and 2. The extent of pre-load is adjustable by varying the distance of the plates 1, 2, as for instance, by varying the length of the link 5. If a force P (Fig. 1) in the form of impacts acts on the end of the lever 4, these are absorbed by the rubber body 3. The portion of the rubber body between the link 5 and the point of impact of the force P is compressed; the portion on the opposite side of the link 5 is relieved. Springing action is soft at first. After the motion dies out, the body springs back, its portion on the left hand side of the axis I—I rendering an absorbing effect. Under heavy impacts the link 5 swings in its mountings 6 and 7 so that all of the rubber body is forced to do certain work to change its shape, which action also promotes the absorbing effect.

One embodiment of the suspension system is illustrated in Figs. 2 to 4. A cylindrical hollow rubber body 8, as shown in Fig. 4, is used which is placed between two pressure plates 1' and 2'. To secure the body 8 in its position, both plates are provided with pins 9 and 10 on the sides facing each other, said pins 9, 10 extending into the bores of the hollow rubber body 8. Plate 1', which is mounted on the frame 11, has a bearing 12. The links 5' are journalled on the pins 13 of the bearing and enclose the body 8. The links 5' have slots 14 through which extend bolts 15 on a shaft 16 journalled on the plate 2'. By adjustment of the screws 17, the length of the links 5' can be varied and thus the distance of the plates 1' and 2' to adjust the pre-load.

Instead of the link construction shown, the links may also form turnbuckles.

The pressure plate 2' is rigidly connected with the lever 4' which at its end may be provided with the axle bearing, a seat bucket, or the like. As can be seen from Fig. 2, the rubber body 8 may be offset from the center of the links 5' towards the side of the lever 4' so that about the same conditions are present as indicated in Fig. 1.

In the embodiment of a seat suspension, illustrated in Figs. 5 and 6, the axis of the hollow rubber body 18 is almost horizontal. Furthermore, a parallel construction is provided for the seat bucket.

The pressure plate 20 is secured in a fixed mounting 19 on a vehicle. The hollow rubber body 18 rests against the pressure plate 20. On the opposite side of the hollow rubber body the plate 21 is arranged which is rigidly connected with a lever 22 carrying the seat.

On the sides facing each other both plates have projections 23 which extend into the bores of the body 18 so that the hollow rubber body 18 cannot be displaced relative to the plates.

Both plates 20, 21 are provided with welded-on rollers 24 and also have perforations 25. Links 27 which form turnbuckles 26 and extend through the bores 25 engage the rollers 24 so that both plates 20 and 21 are tiltably connected with each other. The links 27 are outside the centerline of the hollow rubber body 18.

The seat bucket (not shown) is carried by an arm 29 which through means of a bolt 30 is hinged on the suspended lever 22. The arm 29 forms a type of connecting rod which in turn is hinged on the bearing bolt 32 provided on the mounting 19. The link 31 has an adjusting screw 33 and is thus of variable length. Connection of the link 31 with the arm 29 is obtained by means of a bolt 34. The seat bucket arranged on the arm 29 can swing up and down, during which movement the hollow rubber body 18 renders a springing and an absorbing effect. The seat bucket, however, is maintained in its horizontal position.

While we have disclosed several embodiments of the present invention, it is to be understood that these embodiments are given by example only and not in a limiting sense, the scope of the present invention being determined by the objects and the claims.

We claim:
1. A suspension system, especially for vehicles having parts to be suspended, comprising a hollow body of resilient material in the form of a ring, fastening means comprising a first plate fixed to one of said parts to be suspended, a second plate disposed on another of said parts to be suspended, side arms, and means pivotally connecting both of said plates to said side arms, said hollow body of resilient material being pre-loaded and disposed between said plates, and said hollow body of resilient material being offset from the plane of said side arms.

2. A suspension system, especially for vehicles having parts to be suspended, comprising a cylindrical hollow body of resilient material in the form of a ring defining a center bore, fastening means comprising a first plate fixed to one of said parts to be suspended, a second plate disposed on another of said parts to be suspended, and adjustable link means pivotally connecting said plates to each other, said hollow body of resilient material being pre-loaded and disposed between said plates in precompressed position, and said link means for said plates including means for varying the distance between said plates in order to adjust the pre-load of said hollow body, said means pivotally connecting said plates comprising a link extending through said center bore defined by said hollow body of resilient material and pivotally connected at its ends to said respective plates and means varying the length of said link.

References Cited in the file of this patent
UNITED STATES PATENTS

| 1,043,677 | Davis | Nov. 5, 1912 |
| 1,820,753 | Matthews | Aug. 25, 1931 |
| 2,033,938 | Jalbert | Mar. 17, 1936 |
| 2,667,209 | Gunderson | Jan. 26, 1954 |
| 2,729,441 | Henss | Jan. 3, 1956 |

FOREIGN PATENTS

| 527 | Great Britain | of 1910 |
| 38,961 | France | May 19, 1931 |
| 628,255 | Germany | Mar. 30, 1936 |
| 1,023,277 | Germany | Jan. 23, 1958 |